Dec. 15, 1936.     B. STECHBART     2,064,088
MOTION PICTURE MACHINE
Filed Feb. 3, 1934     2 Sheets-Sheet 1

Inventor.
Bruno Stechbart.

Dec. 15, 1936. B. STECHBART 2,064,088
MOTION PICTURE MACHINE
Filed Feb. 3, 1934 2 Sheets-Sheet 2

Inventor.
Bruno Stechbart.

Patented Dec. 15, 1936

2,064,088

UNITED STATES PATENT OFFICE 2,064,088

MOTION PICTURE MACHINE

Bruno Stechbart, Chicago, Ill., assignor to The Bell & Howell Company, Chicago, Ill., a corporation of Illinois Application February 3, 1934, Serial No. 709,644

6 Claims. (Cl. 242—55)

My invention relates particularly to motion picture projecting machines although not limited to this use alone.

On a motion picture projecting machine it is usual to drive the take up reel spindle from the mechanism of the machine through a frictional slip drive device which in slipping compensates for the varying speed of the reel as the diameter of the roll of film wound thereon increases in diameter. Such frictional slip drive devices are somewhat limited in their effectiveness and as such are not entirely satisfactory.

It is the main object of my invention to provide a film reel drive in which the film reel is driven by an individual electric motor so that the varying diameter of the film roll on the reel is compensated for by the slippage between the armature and field of the motor thus providing a film reel drive which will take up the film on the reel as the film is fed to the reel at a constant rate without the usual disadvantage inherent in a friction slip drive device.

As applied to a motion picture projecting machine other objects of my invention reside in the provision of control of the film reel drive motor or motors with the main motor of the machine with a view toward simplicity and convenience in the operation of the machine.

With these objects in view my invention consists in certain features of novelty in the construction, combination and arrangement of parts by which the said objects and certain other objects, hereinafter appearing, are effected, all as fully described with reference to the accompanying drawings and more particularly pointed out in the appended claims.

In the said drawings—

Figure 1:
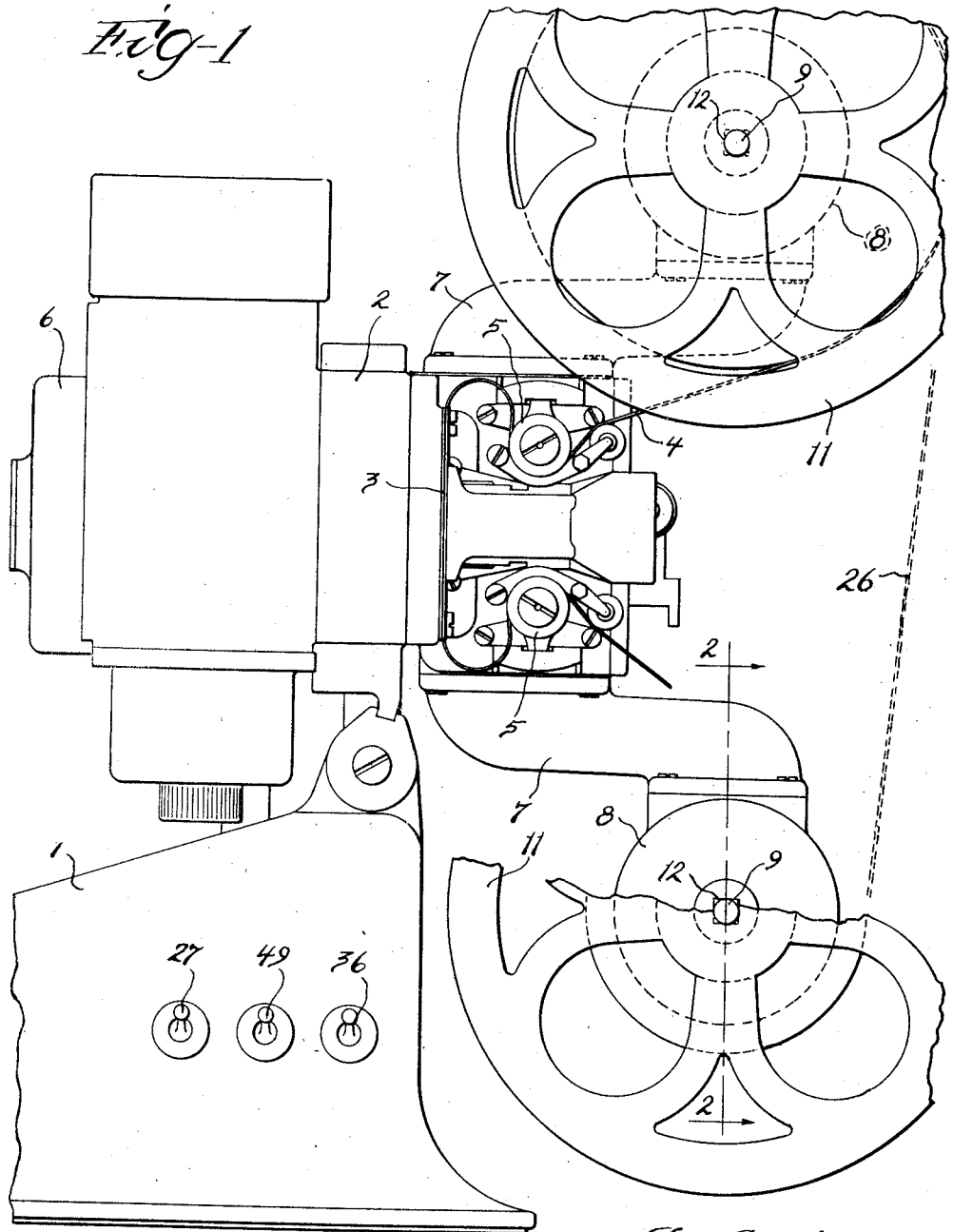
Figure 1 is a partial side elevation of a motion picture machine embodying my invention.

Referring to the drawings, 1 designates a hollow base of a motion picture projecting machine upon which is mounted a main frame or casing 2. See Figure 1. The frame carries the usual projecting mechanism including a light apertured intermittent film feed guide 3 wherein a film 4 is intermittently fed by a usual mechanism not shown and constant feed film sprockets 5 for feeding the film to and from the guide in timed relation with the intermittent feed of the film in the guide.

An electric motor generally designated at 6, is carried within the frame or casing 2 and through suitable mechanism drives the intermittent feeding mechanism and the sprockets 5, the projector proper being similar to that illustrated in U. S. Patent No. 1,587,955, issued June 8, 1926, for Motion picture projecting machine and the like, on application of Albert S. Howell, and requiring no further description for the present purposes.

Projecting respectively from the top and bottom of the front portion of the frame or casing 2 are two forwardly extending hollow film reel arms 7 provided with hollow enlargements 8 at their extending ends, these enlargements being generally circular in cross section on axes disposed transversely of the reel arms and parallel with the axes of the feed sprockets 5.

A film reel spindle 9 is rotatably mounted on each enlargement 8 in concentric relation therewith and accordingly parallel with the axes of the sprockets 5, and projecting ends of these spindles are arranged to have film reels 11 detachably mounted thereon and in driven engagement therewith, as indicated at 12, in a usual manner.

As is usual the film 4 is fed to one of the feed sprockets 5 from the adjacent reel 11 and is taken up from the other sprocket 5 by the other reel during projection, the reel which is taking up the film being driven to wind the film thereon.

As shown both reel spindles are equipped with driving means which are used alternately, and in as much as the driving means of both reels are identical, but one will be described, it being understood that such description is applicable to both.

Figure 2:
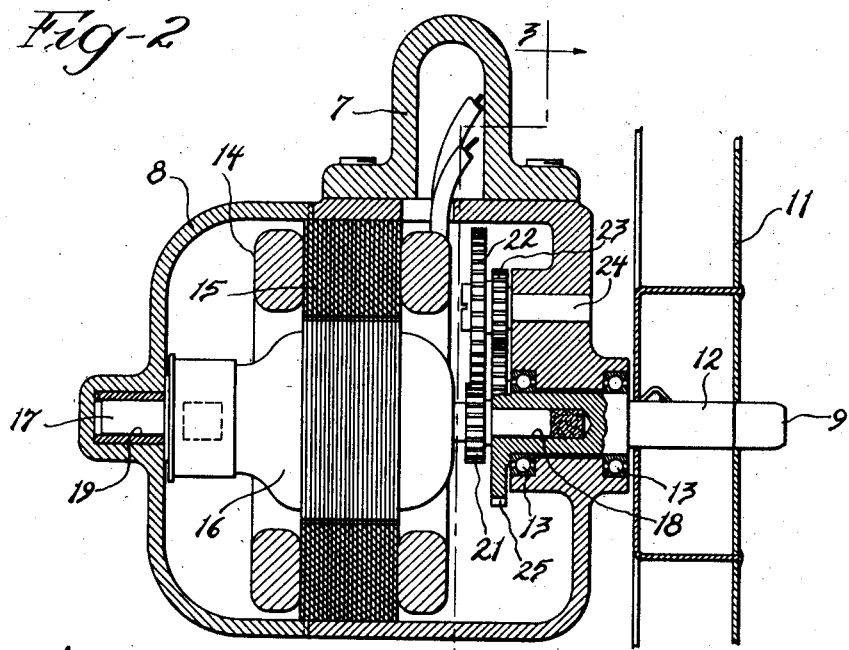
Figure 2 is a partial section on the line 2—2 of Figure 1.
Figure 3:
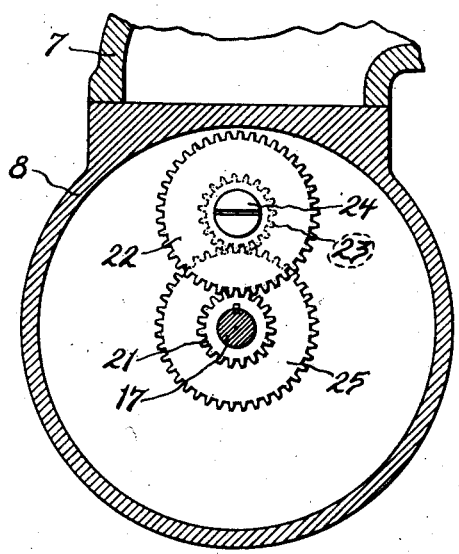
Figure 3 is a partial section on the line 3—3 of Figure 2.

Referring to Figures 2 and 3, the enlargement 8 of the reel arm 7 forms a casing within which is enclosed the reel drive. The reel spindle 9 projects through a concentric bore in one end wall of the enlargement 8 and is rotatably mounted therein by means of ball bearings 13.

An electric motor, generally designated at 14, is disposed within the enlargement 8 in concentric relation therewith and comprises a field 15 secured with the enlargement 8 and an armature 16 mounted on a shaft 17 one end of which is journaled for rotation in a concentric bore 18 in the inner end of the reel spindle 9 and the other end of which is journaled for rotation in a bearing 19 on the end wall of the enlargement 8 opposite that in which the spindle 9 is mounted.

Secured on the motor shaft 17 between the armature 16 and the spindle 9 is a spur gear pinion 21 which meshes with a relatively large spur gear 22 fixed with a relatively small spur gear pinion 23 and rotatably mounted on a stud 24 secured in the adjacent end wall of the enlargement 8. These gears are disposed within the enlargement 8, and the inner end of the spindle 9 projects within the enlargement 8 and has formed on its inner end a relatively large spur gear 25 which meshes with the pinion 23, thus forming a reduction gear drive between the motor 14 and the spindle 9 for the winding of film on a reel 11 mounted on the spindle.

As before stated, both reel spindles 9 are provided with drives for the purposes of permitting operation of the projecting machine in either direction and for rewinding a film from one reel to the other preparatory to again projecting the film in its normal direction, the rewinding of the film being effected by disengaging the film from the feeding mechanism and leading it directly from one reel to the other, as designated at 26 in Figure 1.

Figure 4:
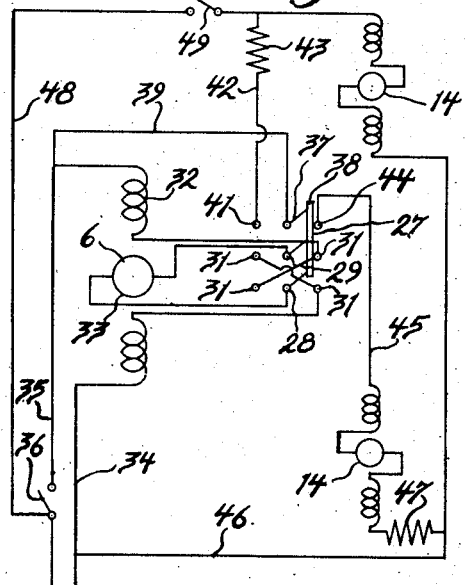
Figure 4 is a wiring diagram of the motor circuit connections of the machine.

Obviously, the reel drive motors 14 are energized alternately in the normal operation of the machine, and each is adapted to drive its spindle and reel thereon in the direction opposite the unwinding direction thereof, and in order to facilitate their control and that of the main or film feed mechanism driving motor 6, they are controlled as follows. See Figure 4.

A three pole double throw electric switch, generally indicated at 27, is preferably utilized for controlling all three of the motors 6 and 14 with reference particularly to facilitating reversely operating the machine.

Two poles of the switch 27 which are indicated at 28 and 29 together with their contacts 31 are connected in circuit between the field, indicated at 32, and the armature, indicated at 33, of the main motor 6 in the usual manner as indicated to reverse the direction of rotation of this motor and thus reverse the direction of operation of the film feeding mechanism and of the film fed thereby.

The motor 6 is energized from a source of electrical energy through two conductors 34 and 35 connected with opposite poles of the motor and of which the conductor 35 includes a switch 36 for cutting off the current to the motor 6 and the reel drive motors 14 as hereinafter described.

The third pole 37 and the poles 28 and 29 of the switch 27 are connected together to be actuated in synchronism, as by bar 38 of insulating material, and the pole 37 is connected with the conductor 35 at the motor side of the switch 36 by a conductor 39. One contact 41 of the third pole 37 is connected with one pole of the upper reel drive motor 14 by a conductor 42 which includes a suitable resistance 43, and the other contact 44 of the third pole 37 is connected with one pole of the lower reel drive motor 14 by a conductor 45.

The other poles of the reel drive motors 14 are connected with the conductor 34 by a branch conductor 46 which includes a resistance 47 in series with the lower reel drive motor.

As so connected and assuming the switch 36 to be closed, the positioning of the switch 27 in one of its positions energizes the motor 6 and one of the reel drive motors, and the positioning of the switch 27 in its other or opposite position energizes the motor 6 and the other reel drive motor, thus alternately energizing the reel drive motors.

The direction of rotation of the motor 6 is reversed by the operation of the switch 27 from one position to the opposite position, thus reversing the direction of feed of the film by the feeding mechanism of the projecting machine, and the arrangement is such that the reel drive motors are alternately energized to take up the film in either direction of operation of the film feeding mechanism, the reel drive motor which is connected to the reel which is acting as the feed reel being free to be rotated by the film being drawn from this reel.

The switch 36 acts to control current to the motor 6 and to the reel drive motors 14 through the pole 37 of the switch 27 so that it provides for conveniently controlling the operation of the projector.

The normal or customary direction in which the film feeding mechanism is run is that in which the film is fed downwardly to the lower film reel, the switch 27 being positioned to energize the lower reel drive motor 14.

In order that the film may be rewound after projection upon the upper reel drive motor without necessitating energization of the motor 6, the following circuit connections are provided.

A conductor 48 is connected with the conductor 35 on the supply source side of the switch 36 and is inclusive of a switch 49 and is connected with the conductor 42 so that the upper reel drive motor may be energized independently of the motor 6 and the lower reel drive motor 14 for rewinding the film, the conductor 48 being connected with the conductor 42 between the resistance 43 and the upper reel drive motor 14 in order to increase the power for rewinding.

The switches 27, 36 and 49 are preferably mounted in adjacent relation on the base of the projector, as shown in Figure 1, to centralize the control.

Having thus described my invention, I do not wish to be limited to the precise details described as changes may be readily made without departing from the spirit of my invention, but having thus described my invention, I claim as new and desire to secure by Letters Patent the following:

1. In a motion picture projecting machine the combination with an electric motor and film feeding mechanism driven thereby, of a rotatable film reel associated with said feeding mechanism, a second electric motor for driving said film reel to wind a film thereon, and electric switch means for controlling both of said motors comprising reversing switch means in circuit with said first mentioned motor to control the direction of rotation thereof and switch means in circuit with said second motor and adapted to close the second motor circuit in one position of said reversing switch means and to open the second motor circuit in the opposite position of said reversing switch means.

2. In a motion picture projecting machine the combination with an electric motor and film feeding mechanism driven thereby, of a rotatable film reel associated with said feeding mechanism, a second electric motor for driving said film reel to wind a film thereon, electric switch means for controlling both of said motors comprising reversing switch means in circuit with said first mentioned motor to control the direction of rotation thereof and switch means in circuit with said second motor and adapted to close the second motor circuit in one position of said reversing switch means and to open the second motor circuit in the opposite position of said reversing switch means, and an additional electric switch in circuit with said second motor in parallel relation with said first mentioned switch means.

3. In a motion picture projecting machine the combination with an electric motor and film feeding mechanism driven thereby, of two rotatable film reels for feeding a film to and taking up the same from said feeding mechanism, two additional electric motors each for driving a respective film reel to wind a film thereon, and electric switch means for controlling all of said motors comprising reversing switch means in circuit with said first mentioned motor to control the direction of rotation thereof and switch means in circuit with said two additional motors and adapted to alternately close the circuits of these two motors with opposite positioning of said reversing switch means.

4. In a motion picture projecting machine the combination with an electric motor and film feeding mechanism driven thereby, of two rotatable film reels for feeding a film to and taking up the same from said feeding mechanism, two additional electric motors each for driving a respective film reel to wind a film thereon, electric switch means for controlling all of said motors comprising reversing switch means in circuit with said first mentioned motor to control the direction of rotation thereof and switch means in circuit with said two additional motors and adapted to alternately close the circuits of these two motors with opposite positioning of said reversing switch means, and an additional electric switch in circuit with one of said two additional motors in parallel relation with said first mentioned switch means.

5. In a motion picture projecting machine the combination with an electric motor and film feeding mechanism driven thereby, of two rotatable film reels for feeding a film to and taking up the same from said feeding mechanism, two additional electric motors each for driving a respective film reel to wind a film thereon, electric switch means for controlling all of said motors comprising reversing switch means in circuit with said first mentioned motor to control the direction of rotation thereof and switch means in circuit with said two additional motors and adapted to alternately close the circuits of these two motors with opposite positioning of said reversing switch means, an additional electric switch in circuit with one of said two additional motors in parallel relation with said first mentioned switch means, and another additional electric switch in circuit in series relation with said first mentioned switch means and in parallel relation with said last mentioned additional switch.

6. In a motion picture projecting machine the combination with a main frame and an electric motor on said frame and film feeding mechanism on said frame and driven by said motor, of reel arms carried on said frame and projecting therefrom, two rotatable film reel mounts carried on respective of said reel arms, two additional electric motors each mounted on a respective reel arm for driving the respective reel mount, and circuit connections for controlling said motors including electric switch means whereby said first mentioned motor and at least one of said additional motors are controlled together.

BRUNO STECHBART.